United States Patent [19]

Das

[11] Patent Number: 4,925,364

[45] Date of Patent: May 15, 1990

[54] ADJUSTABLE SPACER

[75] Inventor: Ranjan Das, Hobe Sound, Fla.

[73] Assignee: United Technologies Corporation, Hartford, Conn.

[21] Appl. No.: 287,353

[22] Filed: Dec. 21, 1988

[51] Int. Cl.$^5$ .............................................. F04D 29/60
[52] U.S. Cl. ..................... 415/150; 415/162; 415/166; 415/189; 411/5; 411/183; 411/383
[58] Field of Search .............. 415/150, 162, 166, 189, 415/190, 160, 126, 127; 411/383, 384, 395, 3, 5, 84, 85

[56] References Cited

U.S. PATENT DOCUMENTS

| | | | |
|---|---|---|---|
| 2,858,104 | 10/1958 | Kelk et al. | 415/190 |
| 3,444,775 | 5/1969 | Hills | 411/3 |
| 3,458,118 | 7/1969 | Burge et al. | 415/149.4 |
| 3,487,992 | 1/1970 | Pineda | 415/149.4 |
| 3,512,447 | 5/1970 | Vaughn | 411/5 |
| 3,685,920 | 8/1972 | Burge | 415/147 |
| 3,779,665 | 12/1973 | Tatem, Jr. et al. | 415/150 |
| 4,373,859 | 2/1983 | Thebert | 415/159 |
| 4,400,135 | 8/1983 | Thebert | 415/134 |
| 4,558,986 | 12/1985 | Faltys | 415/150 |
| 4,604,030 | 8/1986 | Naudet | 415/126 |
| 4,773,821 | 9/1988 | Gonthier et al. | 415/160 |
| 4,812,106 | 3/1989 | Prugavie | 415/160 |
| 4,826,399 | 5/1989 | Perez | 415/150 |

*Primary Examiner*—Robert E. Garrett
*Assistant Examiner*—John T. Kwon
*Attorney, Agent, or Firm*—Troxell K. Snyder

[57] ABSTRACT

An adjustable spacer (20) is located in a unison ring (16) disposed about a gas turbine engine case (18). The spacer (20) includes a pad bolt (44) having a flattened surface (52) for contacting the case (18). The pad bolt (44) is adjusted radially by a threaded cylinder (28) and adjusting nut (36). The assembly is locked in place by a locknut (54) which includes a frangible link (72) for separating a headed portion (70) from a threaded portion (68).

7 Claims, 2 Drawing Sheets

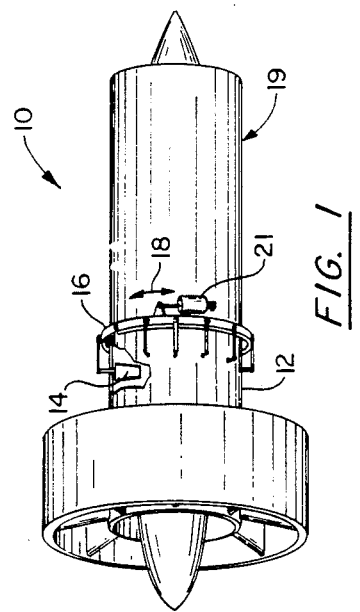
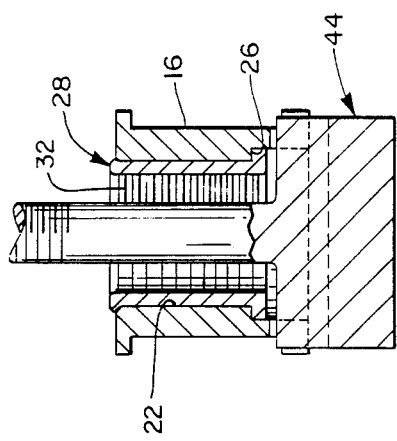
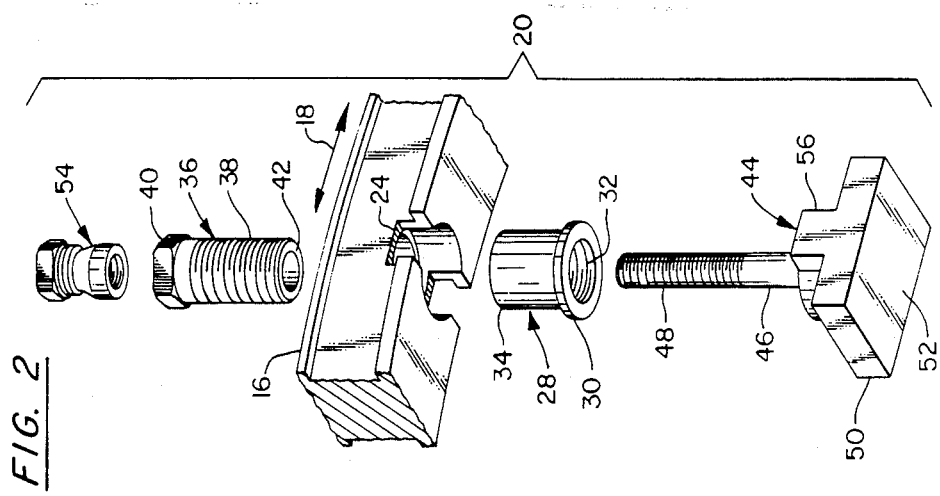

ADJUSTABLE SPACER

FIELD OF THE INVENTION

This invention relates to an adjustable spacer for maintaining a preselected minimum clearance between two relatively translatable members.

BACKGROUND

Axial flow gas turbine engines occasionally utilize one or more stages of variable stator vanes to adjust the flow area and direction of the annular flow of air in the compressor section. The variable vane stage typically comprises a plurality of circumferentially spaced vane airfoils extending radially with respect to the airfoil span across the annular air stream, and pivoted by an actuating linkage which includes an individual pivot arm for each vane airfoil connected to a unison ring encircling the exterior of the generally cylindrical engine housing and rotated circumferentially to simultaneously vary the angle of attack and nozzle outlet area of the entire variable vane stage.

The engine housing or case is relatively rigid, while the unison ring is typically designed to be as light in weight as is consistent with the need to maintain an accurate positioning of each vane. The unison ring is thus typically supported by the engine housing having a plurality of bearing means distributed about the housing exterior for positioning and supporting the circumferentially movable unison ring.

The simplest bearing arrangement is a plain bearing surface comprising a relatively flat pad or similar area in the outer surface of the engine housing which interacts with a similar flattened surface secured to the unison ring. By maintaining a close clearance between such flat surfaces in the unison ring and engine housing, the actuating unison ring will be maintained concentric with the cylindrical engine housing, thereby minimizing any error in vane position which may result from flexing or warping of the unison ring.

Prior art means for maintaining a uniform spacing between the unison ring and the engine housing include pad members or sections disposed respectively in the housing and the inner diameter of the unison ring which are machined during assembly of the engine to the desired spacing. As will be appreciated by those familiar with this process, the repeated removal and reinstallation of the unison ring in order to machine the respective pads to the proper size is extremely time consuming and complex.

SUMMARY OF THE INVENTION

It is therefore an object of the present invention to provide an adjustable spacer for maintaining a minimum separation between two translating members.

It is further an object of the present invention to provide a spacer which is adjustable with a minimum amount of additional tooling.

It is still further an object of the present invention to provide a spacer which is positively locked in the desired position and which is resistant to subsequent adjustment or tampering.

According to the present invention, a first member which is translatable relative to a second member is provided with an adjustable spacer for maintaining at least a minimum normal displacement between the two members. The spacer includes a pad bolt having a flattened head, preferably adapted to contact a corresponding flat surface on the second member, and which is positioned by an adjusting nut engaged with the first member.

The adjusting nut is locked into position, following the initial adjustment of the pad bolt, by means of a lock nut engaging a threaded portion of the pad bolt which extends through a hollow bore in the adjusting nut. Thus, the lock nut has the dual function of retaining the pad bolt in an abutting relationship with the adjusting nut as well as locking the adjusting nut against rotation and hence loss of the initial spacer setting.

One feature of the spacer according to the present invention is the combination of tamper resistance with overtorqueing protection. This is achieved by configuring the lock nut into a threaded portion and a headed portion connected by a frangible torque link. During installation of the spacer according to the present invention, the lock nut is tightened on the pad bolt by a wrench or other tool engaged with the headed portion. Upon reaching a preselected torque limit, the frangible link separates, with the headed portion being removed and discarded while the threaded portion remains tightly secured against the adjusting nut.

The adjustable spacer of the present invention may also be secured more firmly by providing an antirotation means between the pad bolt and the first member. Such antirotation means includes an enlarged shaped portion of the pad bolt adjacent the flat end and configured to be received within a similarly shaped recess in the first member, the recess and head being shaped so as to prevent rotation when the pad bolt is secured in place.

Unlike prior art spacers which may require shimming or trimming, the adjustable spacer according to the present invention provides quick adjustment at the time of installation with automatic conversion to a tamper resistant, locked configuration.

Both these and other objects and advantages of the adjustable spacer according to the present invention will be apparent to those skilled in the art upon review of the following specification and the appended claims and drawing figures.

BRIEF DESCRIPTION OF THE DRAWINGS

FIG. 1 shows an exterior, schematic view of a gas turbine engine with a variable vane stage and unison ring linkage.

FIG. 2 shows the adjustable spacer according to the present invention prior to assembly.

FIG. 4 shows a cross section of the unison ring and pad bolt as indicated in FIG. 3.

DETAILED DESCRIPTION OF THE PREFERRED EMBODIMENT

Figure 3:
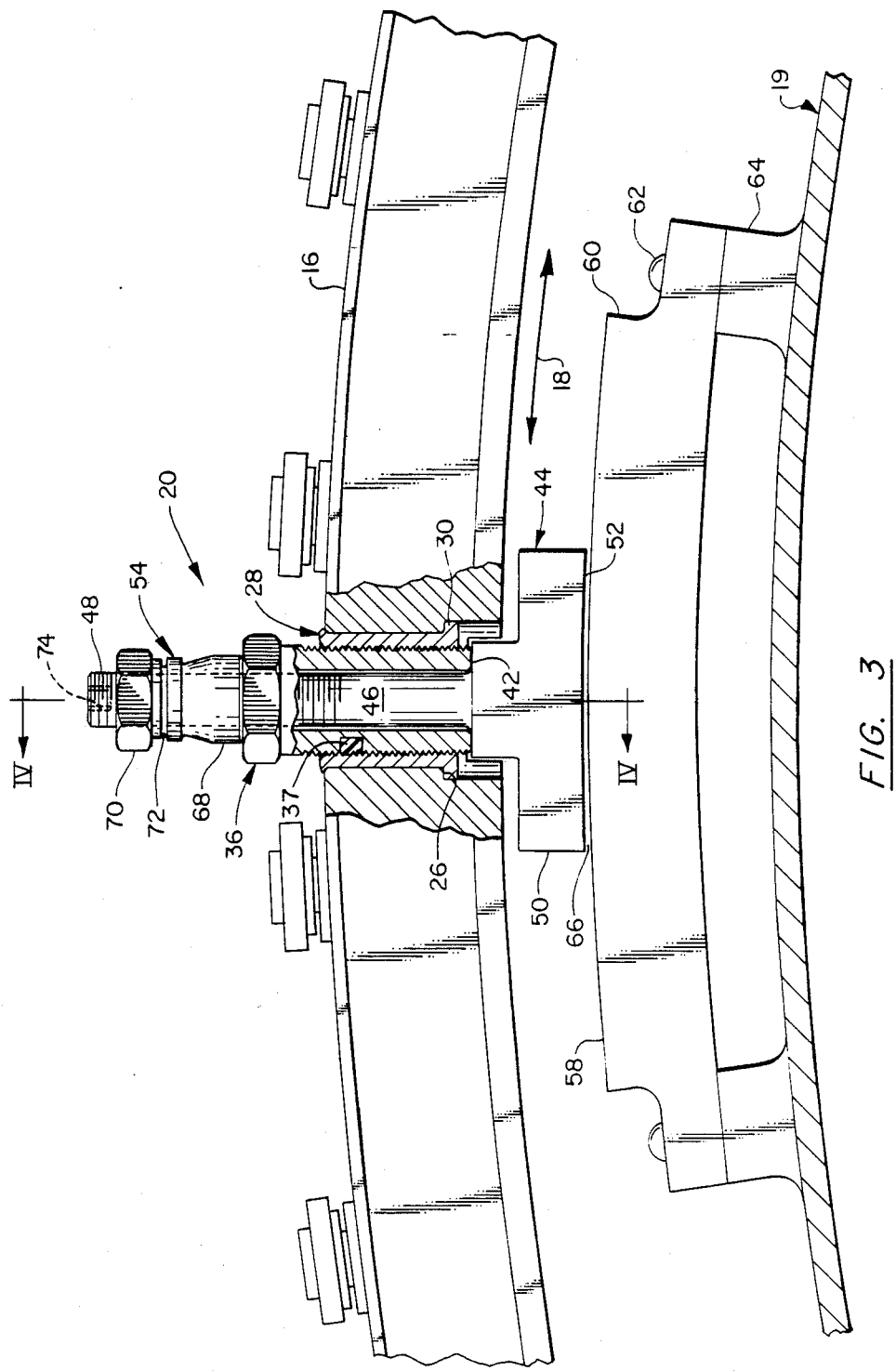
FIG. 3 shows the assembled adjustable spacer according to the present invention as it would appear installed in the gas turbine engine of FIG. 1.

Referring now to the drawing figures, and in particular to FIG. 1, the environment of the invention will be disclosed. FIG. 1 shows a gas turbine engine 10 having a compressor section 12 with a stage of variable compressor vanes 14 simultaneously positioned by an external unison ring 16. The unison ring 16 is reciprocated 18 by a linear actuator 21, or the like.

The present invention relates to a plurality of adjustable spacers (not shown in FIG. 1) distributed uniformly about the unison ring 16 for maintaining a fixed radial displacement between the ring 16 and the cylindrical engine case 19.

FIG. 2 shows the various components of the adjustable spacer 20 prior to assembly. The unison ring 16 includes a bore 22 extending therethrough in the radial direction. Also shown is a shaped recess 24 disposed in the unison ring 16 at the radially inward end of the bore 22. A shoulder 26 adjacent the radially inward opening of the bore 22 is also visible.

The spacer includes a cylindrical barrel 28 having an enlarged flanged end 30 and an internal threaded passage 32. The barrel 28 slides radially into the bore 22 with the flange 30 contacting the shoulder 26 for retaining the barrel 28 against further movement into the bore 22. As will be disclosed and shown below, the end 34 of the barrel opposite the flange 30 may be peened, staked, or otherwise deformed so as to retain the barrel 28 within the bore 22.

The next component of the adjustable spacer 20 is a threaded adjusting nut 36 which includes an external threaded portion 38, an adjusting head 40 and an internal bore 42. The adjusting nut 36 engages the threaded portion 32 of the barrel 28 and may be adjusted radially as to position by rotation.

Also shown in the assembled view of FIG. 3 is a nylon insert 37 which engages the threads 38 of the adjusting nut 36 for preventing inadvertent rotation of the nut 36. This feature may equivalently be achieved by any one of a variety of known antirotation arrangements, including heli-coil, etc.

Received within the adjusting nut bore 42 and extending therethrough is a pad bolt 44 having an elongated rod 46 extending radially through the adjusting nut 40 and further including a threaded portion 48 on the radially outer end thereof, and a substantially flat pad portion 50 disposed at the radially innermost end of the pad bolt 44 which includes a flattened surface 52 for engaging a similar flattened surface (not shown in FIG. 2) on the exterior of the engine housing 18. The threaded portion 48 of the rod 46 is engaged by an internally threaded lock nut 54 which draws the pad bolt 44 radially against the adjusting nut 36 when tightened during assembly of the adjustable spacer 20.

One other feature of the spacer 44 is an englarged shaped portion 56 disposed adjacent the pad portion 50 of the pad bolt 44, the enlarged shaped portion 56 being configured similarly to the recess 24 and received therein for preventing rotation of the pad bolt 44 relative to the unison ring 16. The shape of the recess 24 and shaped portion 56 may be an axial slot as shown in FIG. 2, or any of a variety of noncylindrical shapes which will prevent rotation between the pad bolt 44 and the unison ring 16 when the shaped portion 56 is received within the recess 24.

The assembled spacer 20 is shown in FIG. 3 in a view taken in the plane of the unison ring 16 as the spacer 20 would appear assembled about an engine case 19. The threaded barrel 28 is secured within the ring 16 against radially outward movement by the engagement of the barrel flange 30 with the shoulder 26 formed in the unison ring 16. The adjusting nut 36 is positioned to extend radially inward of the flange 30, abutting the pad bolt 44 and thereby providing radial adjustment thereof relative to the unison ring 16. The relatively flat surface 52 of the pad 50 slidably engaged a smooth, corresponding surface 58 in the exterior of the engine housing 19.

According to the preferred embodiment of the present invention, the smoothed surface 58 is formed in a removable slide plate 60 riveted 62 to a raised boss or other thickened portion which may be cast or otherwise formed in the exterior of the engine housing 19.

Adjustment of the spacer 20 during installation is most easily accomplished by providing a sized shim (not shown) positioned within the gap 66 between the pad surface 52 and the smooth casing surface 58. A sized shim is provided between each pad bolt 44 about the circumference of the unison ring 16. The adjusting nuts 36 are then rotated so as to drive the pad bolts 44 radially inward until all the pad bolts, preferably at least four, equally contact the installation shims.

Following the initial positioning of the pad bolts 44, the spacer 20 according to the present invention is positively locked into position by application of the lock nut 54 to the radially extending, threaded end 48 of the pad bolt rod 46. The lock nut 54 is tightened down on the threaded portion 48 so as to contact the adjusting nut 36 and compress the pad bolt 44 against the radially inward end 42 of the adjusting nut 36. At this time the shims are removed and the unison ring 16 is maintained at a fixed minimum distance from the engine case 19 as it is reciprocated 18 over the desired operating range.

Another feature of the spacer 20 according to the present invention is provided by the lock nut 54 which includes a threaded portion 68 and a headed portion 70 joined by a frangible torque link 72. During assembly of the adjustable spacer 20 according to the present invention, the lock nut 54 is torqued onto the threaded portion 48 of the pad bolt rod 46 until such time as the threaded portion 68 contacts the radially outer end of the adjusting nut 36. By engaging the headed portion 70 of the lock nut 54 with a simple wrench or other tool, the assembler can increase the torque applied to the lock nut 54 until such time as the frangible torque link 72 reaches its design limit and fractures. The headed portion 70 is thus removed leaving the threaded portion 68 of the lock nut 54 engaged with the threaded end 48. As will be noted from the drawings, the threaded portion 68 of the lock nut 54 is relatively smooth, without shaped surface features which could easily be engaged by a removing wrench or the like. Thus, the lock nut 54 after installation is relatively tamper resistant, while the provision of a frangible torque link having a design limit selected to match the optimum tightening torque for the lock nut 54, provides an inherently simple means for properly and positively locking the adjustable spacer 20 during assembly.

Finally, FIG. 4 shows the indicated view of FIG. 3 taken transversely through the unison ring 16 showing the cylindrical barrel 28 and the pad bolt 44. It should be noted that the cylindrical spacer 28 may be equivalently provided by providing a threaded hole in the unison ring 16 with the proper interior diameter. The cylindrical barrel insert 28 is preferred in the spacer 20 according to the present invention due to enhanced materials properties which may be provided in an insert 28, as well as the reduced likelihood of crack initiation of propagation which is provided by such an insert 28.

Finally, removal of the adjustable spacer, and in particular the threaded portion 68 of the lock nut 54 may be accomplished by providing the radially outer end of the pad bolt rod 46 with an internal keyway or other engaging recess 74 whereby the rod 46 may be held while a clamp or other gripping member engages the threaded portion 68 of the lock nut 54 and releases the pad bolt 44. A new lock nut 54 may then be placed on the threaded end 48 and used to resecure the adjustable spacer 20 following adjustment of the adjusting nut 36 as necessary.

The adjustable spacer according to the present invention is thus well suited to achieve the objects and advantages set forth hereinabove. It should also be noted that although disclosed and claimed in terms of the preferred embodiment illustrated by the accompanying figures and preceding description, the adjustable spacer according to the present invention may equivalently be embodied in a number of other configurations, with the scope thereof being limited only by the claims presented hereinbelow.

I claim:

1. An adjustable spacer for maintaining a minimum normal displacement between a first member and a relatively flat surface disposed in a second member, comprising:
    a cylindrical barrel having a threaded axial passage disposed therein, further having an external flange disposed about one end thereof, the barrel received within a close fitting hole disposed through the first member with the flanged end of the barrel engaging an annular shoulder within said hole,
    an adjustable nut, disposed within the threaded passage and including an externally threaded surface engaged therewith, further including the first end projecting past the flanged end of the barrel and a second end projecting past the other end of the barrel opposite the flanged end thereof, a pad bolt, including a flattened pad end, for contacting the relatively flat surface, and a rod portion extending perpendicular to the flat surface and through the central passage in the adjusting nut, said bolt portion including an externally threaded portion at the end thereof opposite the pad end, and
    a lock nut, having internal threads engaging the threaded portion of the pad bolt, said pad bolt contacting the first end of the adjusting nut when the lock nut is engaged securely against the second end of the adjusting nut.

2. The spacer as recited in claim 1, wherein
    the second member is a cylindrical housing and
    the relatively flat surface is disposed on the exterior thereof, and wherein
    the first member is annular and disposed coaxially about the housing, the first member being disposed radially with respect to the housing by the spacer.

3. The spacer as recited in claim 2, wherein
    the annular member is a unison ring cooperatively linked to a plurality of variable position stator vanes disposed within the cylindrical housing.

4. The spacer as recited in claim 3, wherein the cylindrical barrel within the hole in the first member is deformed at the end opposite the flanged end thereof, thereby being retained within the first member.

5. The spacer as recited in claim 1, further comprising antirotation means, disposed between the pad bolt and the first member, including
    an enlarged recess disposed in the first member adjacent the flanged end of the cylindrical barrel, and wherein
    the pad bolt includes an enlarged portion shaped to engage the recess in the first member, the shaped portion and the recess configured to be noncylindrical with respect to the axis of the barrel.

6. The spacer as recited in claim 1 wherein the lock nut includes
    a headed portion disposed opposite the adjusting nut, the headed portion joined to the threaded portion of the lock nut by a frangible torque link, said torque link adapted to fracture upon imposition of a torque higher than a preselected limit.

7. The spacer as recited in claim 1 further comprising means disposed between the cylindrical barrel and the adjusting nut for preventing inadvertent rotation therebetween.

* * * * *